April 15, 1924.
C. W. PHILIP
1,490,849
METHOD OF MAKING PISTONS
Filed Nov. 20, 1922
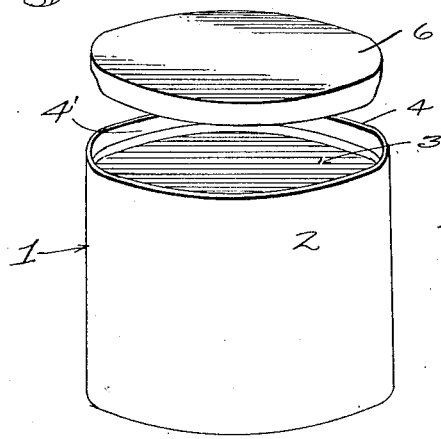
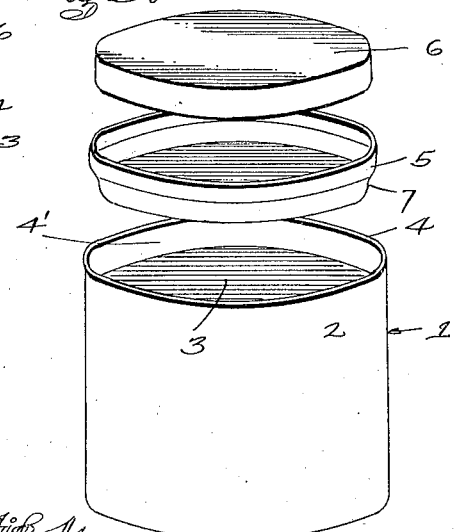
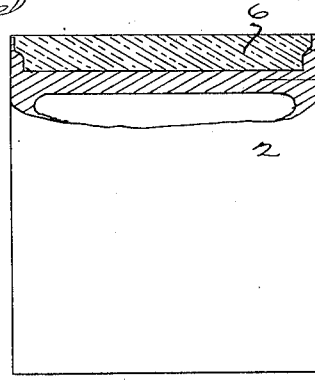
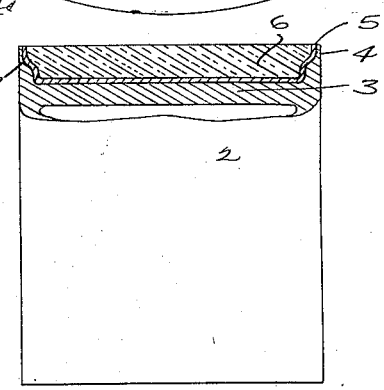
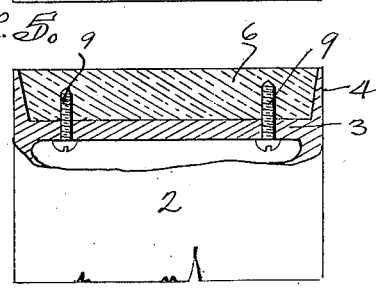
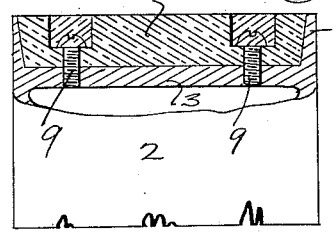
INVENTOR
CHARLES W. PHILIP
BY HIS ATTORNEY
Lincoln Johnson Patented Apr. 15, 1924.

1,490,849

UNITED STATES PATENT OFFICE.

CHARLES W. PHILIP, OF SAN FRANCISCO, CALIFORNIA.

METHOD OF MAKING PISTONS.

Application filed November 20, 1922. Serial No. 602,250.

*To all whom it may concern:*

Be it known that I, CHARLES W. PHILIP, a citizen of the United States, and a resident of the city and county of San Francisco, State of California, have made a new and useful invention—to wit, Improvements in Methods of Making Pistons; and I do hereby declare the following to be a full, clear, concise, and exact description of the same.

This invention relates particularly to a method for making pistons for internal combustion engines.

An object of the invention is to provide a method for making pistons with a facing of non-conducting, heat resisting material on the end thereof, exposed to combustion, and that will not absorb or conduct heat.

Further objects of the invention are to provide a piston with non-conducting material on the end thereof, to minimize and practically eliminate the transference of heat to the piston skirt; a piston that will operate efficiently without the use of piston rings; a piston that will do away with the destructive effects of heat on the lubricating oils; a piston that will prevent premature firing, and the collection of deposits of carbon and a piston that will be superior in point of simplicity and inexpensiveness of construction, positiveness of operation, facility and convenience in use and general efficiency. Other objects and advantages will appear as this description progresses.

In this specification and the annexed drawings, the invention is illustrated in the form considered to be the best, but it is to be understood that the invention is not limited to such form, because it may be embodied in other forms, and it is also to be understood than in and by the claims following the description, it is desired to cover the invention in whatsoever form it may be embodied.

In the accompanying one sheet of drawings;

Fig. 1 is the diagrammatic view of a piston constructed in accordance with my invention, in separated position.

Fig. 2 is a cross section of the form shown in Fig. 1, in the assembled position.

Fig. 3 is a diagrammatic view of a modified form of piston constructed in accordance with my invention, and with the parts thereof, in separated position.

Fig. 4 is a cross section taken of the form shown in Fig. 3, in the assembled position.

Fig. 5 is a cross section through a modified form of piston.

Fig. 6 is a cross section through a modified form of piston.

In detail, the construction illustrated in the drawings, comprises the piston 1, formed of a metal body 2, cylindrical in cross section, and having the closed end 3. The interior of the piston is constructed to receive a connecting rod or any equivalent means (not shown) to effect movement of the said piston. The exterior of the head or closed end of the piston is provided with an annular projecting shoulder 4, forming a cup-shaped cavity or depression 4', within which is adapted to be integrally incorporated a metal cup 5 having a suitable disk of non-conducting material 6, thereon.

In the manufacture of pistons in accordance with the practice of my invention, it has been found necessary to follow the following process or method. A suitable heat resisting non-conducting material,—such as steatite, compressed lava or compressed asbestos or any other equivalent material, having a body texture capable of withstanding the destructive effects of heat and combustion, and preventing the absorption or conduction of heat,—would be formed preferably as a circular disk. The disk 6, after being cut or formed in a desired manner, would be slowly baked in an oven under a heat of approximately on thousand (1,000) degrees F. for approximately one (1) hour to drive off any water or other obnoxious elements that might be contained therein. The baking in the high heat also serves to harden the mass and to make it flint like in texture.

The disk 6 of the material would then be cooled and placed within the tinned metal cap 5, so that the said disc would fit snugly within the cap. To prevent the disc 6 from moving within the cap 5, the edges of the disc 6 could be made thicker at one side than at the other. When placed within the cap, the peripheral edge of said cap could be peaned or bent over to snugly engage the tapered edge of the disc. The cap 5, with the disc 6, therein would then be placed in a suitable piston mold and molten iron, or other metal, poured into said mold around the cap 5 and allowed to harden to form a cast or piston the shape of the mold. The cast metal, it has been found, will readily adhere to the tinned exterior of the cap 5, and form a homogeneous union therewith. After the cast metal cools and contracts, it has a tendency to shrink onto the metal cup, to homogeneously unite therewith, and to tightly bind said cup against the peripheral edge of the disc 6. The completed piston, shown in Figs. 2 and 3, thus has the metal cap and non-conducting material fixedly embedded therein, so that the assemblage forms a substantially integral unit.

In order to minimize the exposed metal surface of the piston within the cylinder, it has been found good practice, to reduce the cavity diameter 4' by cutting down the edge wall thereof, as at 7, to a considerably lesser thickness than that of the wall adjacent the bottom of the said cavity. Upon completion of the casting operation with the non-conducting material securely embedded within the piston, the projecting shoulder 4 of the piston would be turned down so that the face thereof would be flushed with that of the non-conducting material 6. In a similar manner, the diameter of the piston would be turned down for reducing the area of metal on the piston end desired to be left exposed to combustion and for the purpose of making said piston light in weight.

Although the metal cap has been described more particularly with reference to being cast within the piston, whereby the piston metal will integrally unite with the cap, or disc, it is to be understood that it would be clearly within the purview of this invention to first cast a piston with a suitable cavity therein, and then to expand the cavity by heat, to receive the cap, or heat resisting material, as shown in Fig. 1, or to autogenously, or otherwise, bring about a permanent union of the piston and non-conducting material.

In the construction shown in Figs. 1 and 2 it is desirable to effect a permanent bond between the non-conducting material and the material of which the piston may be formed, without the interposition of the metal cup. This may be accomplished by forming the cavity in the closed end of the piston in the usual manner. The edge wall of said cavity would be expanded by heat to allow placement therein, of the disk of non-conducting material. As the piston would cool, and the diameter of the cavity return to normal, the said material would be shrunk into the desired fixed position. The non-conducting material might also be placed into the head of the piston by arranging the same in the cavity, and sealing the space between the piston and non-conducting material, by welding in filler throughout the entire circumference of the said space. Furthermore, the non-conducting material might be secured to the piston by tapping the under-face of the same, to receive fastening screws 9, arranged on the piston or vice versa, the non-conducting material can be drilled, and the piston tapped for the reception of fastening screws, as shown in Fig. 6. Where the last described method of fastening would be resorted to, the holes remaining would be plugged with non-conducting material capable of uniting with the mass in which it would be placed.

Experiments with pistons formed with non-conducting material placed upon the head thereof, when utilized in the cylinders of internal combustion engines, have shown that carbon or other waste hydrocarbon particles will not collect on the non-conducting material, inasmuch as it will not absorb heat that will cause it to arise to a temperature where carbon will collect, the same as the contiguous parts. In the conventional all metal piston, the same becomes heated to approximately the heat of combustion. The fuel gas that strikes this heated surface is broken up and disintegrated so that the fuel particles adhere to those portions of metal with which they come in contact. After an initial deposit has been made, waste hydrocarbon particles generated from combustion readily collect and form a dirty and foul combustion chamber, resulting in premature combustion and reduction in efficiency. Furthermore, with the all-metal type of piston the heat of combustion is transferred by conduction and convection through the piston skirt to the lubricating oils, tending to destroy the body thereof and diminish the physical properties for lubricating purposes. A piston constructed in accordance with my invention prevents the oil being heated, or the lubricating properties thereof destroyed, whereby the said oil will be useful for a long period of time, and, furthermore, that portion of the piston within the combustion chamber presents a relatively cool or unheatable surface which will not cause premature firing or the collection of carbon deposits. I have discovered in my experiments that the piston, when arranged in accordance with my invention, does not require the use of gas or oil leakage rings, such as are necessary to use with the conventional type of piston. I attribute the elimination of the necessity of rings to the fact that my piston may be fitted to the cylinder with a smaller initial clearance, as contrasted with the conventional method of fitting pistons and cylinders, and that the proportionate increase in piston diameter, due to expansion by heating, is far less in my piston, than in all others.

Having thus described this invention, what I claim and desire to secure by Letters Patent is:

1. The method of arranging a disk of non-conducting material in a cavity in the closed end of a piston, comprising, expanding by heat the shouldered portion of said cavity and placing said disk within said expanded cavity; to be forced into tight contact therewith as the expanded cavity shrinks in cooling.

2. The method of making pistons, herein described, comprising, forming a cavity in the closed end of a piston; expanding by heat the edge wall of said cavity; and placing a disk of non-conducting material within the expanded edge wall of said cavity to be forced into fixed contact therewith as said wall shrinks in cooling.

3. The method of making pistons, comprising, forming a cavity in the closed end of a piston; heating the said piston cavity and arranging a disk of non-conducting material within the heated piston cavity to obtain a shrink fit engagement after said piston cavity is cooled.

4. The herein described method of making pistons, comprising, heating a disc of non-conducting material to an approximate temperature of one thousand degrees (F.) and cooling the same; arranging said disk within a metal cup and placing said cup within a cavity in a piston end in a shrink fit engagement, to leave said non-conducting material exposed.

5. The method of making pistons, herein described, comprising, forming a cavity in the closed end of a piston; expanding by heat the edge wall of said cavity; placing a metal cup within the expanded edge wall of said cavity; and placing a disk of non-conducting material within said cup to be forced into fixed contact therewith as said cup contracts through shrinkage in cooling of said cavity wall.

6. The method of making pistons, herein described, comprising, forming a cavity in the closed end of a piston; expanding by heat the edge wall of said cavity; placing a disk of non-conducting material within said cavity; and interposing a metal cup between said disk and the cavity end, its edge wall to be forced into fixed contact therewith, as said wall shrinks in cooling.

In testimony whereof, I have hereunto set my hand at San Francisco, California, this 31st day of October, 1922.

CHARLES W. PHILIP.

In presence of—
LINCOLN V. JOHNSON.